Nov. 11, 1952
A. BODNAR
2,617,137
APPARATUS FOR DUSTING CAPSULES
Filed March 22, 1948
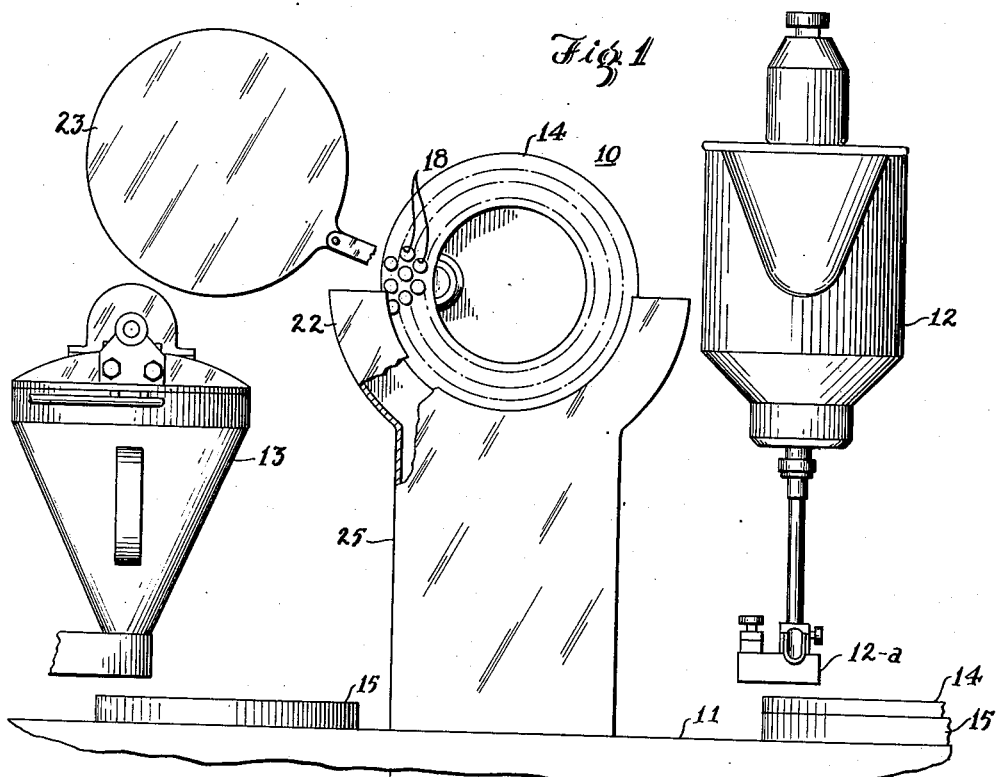
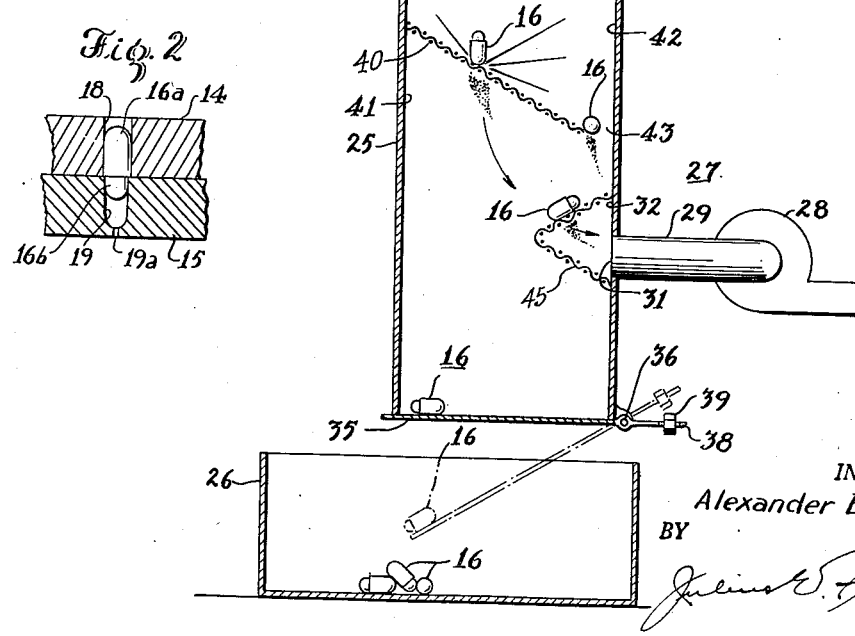
INVENTOR.
Alexander Bodnar
BY
ATTORNEY Patented Nov. 11, 1952

2,617,137

UNITED STATES PATENT OFFICE 2,617,137

APPARATUS FOR DUSTING CAPSULES

Alexander Bodnar, Bronx, N. Y.

Application March 22, 1948, Serial No. 16,316

1 Claim. (Cl. 15—308)

This invention relates to capsule filling machines and particularly to a machine which is constructed to automatically dust the capsules after they are filled.

The primary object of this invention is to provide mechanism for automatically dusting, filled medicinal capsules to remove any powdery dust of the filling material from the outer surface of the capsules, so the filled capsules will come out of the filling and dusting machine with the outer surface of each capsule entirely clean.

Another object of this invention is to provide apparatus for cleaning filled capsules without requiring manual handling to remove the powdery dust that engages and adheres to the outer surface of a capsule as a result of the filling operation.

The invention herein is an improvement upon the capsule filling machine of the type shown in U. S. Patent No. 1,819,936 issued August 18, 1931 to Warren Wilkie and A. A. Leverenz, and assigned to Parke-Davis Co.

As shown in that patent the capsules are mechanically filled with a powdered medicinal material. In the process of preparing the capsules for filling, a large number of closed capsules are individually and mechanically placed in prepared holes in two close-fitted co-operating disk plates. Each pair of corresponding holes in the plates is co-axially aligned in the two plates, to receive one closed capsule, and the holes in the disks are arranged symmetrically around the axes of the disks, parallel to the common central axis of the disks. When the holes are filled with capsules, a vacuum is formed in the region at the back surface of one plate. That vacuum serves to separate the capsules, so the body portions of the capsules will all be in one disc plate and the cover or cap portions will all be in the other disc plate.

The plate with the body portions is then placed in position under a hopper filled with the medicinal material. The plate is gradually rotated and moved past the mouth of the hopper to progressively expose the open body portions of the capsules to the mouth of the hopper, while a mechanically operated screw in the hopper forces the material from the hopper down into the capsule bodies.

The surface of the plate and the mouth of the hopper were originally ground smooth and are kept relatively tightly engaged while the plate is slid past the hopper mouth. Nevertheless from the very nature of the filling operation and the powdery character of the filling material, the sliding fit cannot be kept tight enough to prevent leakage of that finely powdered material. Consequently a great deal of the powdery filling material escapes onto the machine parts and into the atmosphere.

After the capsule bodies are filled, the body plate is removed from beneath the hopper and re-assembled in proper position with the other plate containing the capsule covers or caps. The two plates held in such assembled position are then pressed against a pusher device provided with a plurality of pins properly positioned to enter the holes in the plates behind the caps. While a restraining plate behind the body plate keeps the capsules from being forced out, the pusher device is pressed to move the caps back onto the capsule bodies to close the capsules. The restraining plate is then removed and the pusher ejects the capsules filled with the medicinal material. The capsules as thus ejected are collected in a suitable box.

If the capsules were clean when thus collected, they could be immediately packaged. However, because the dust from the material collects on the machine and on the body surfaces of the capsules during the filling operation, the capsules when thus subsequently collected are covered with dust particles of the filling material. It is therefore necessary to clean the filled capsules to remove the adhering dust particles. That requires manual handling. In that cleaning operation, a batch or handful of the capsules are placed on a cloth and moved back and forth with a combined rolling and wiping action until the powdery particles are removed.

That manual cleaning operation is unsanitary. The workers who handle the capsules must wash their hands frequently. The dust particles of the materials get into the atmosphere. In such filling room everything in the room gets covered with the dust of the powdery material. The powdery dust in the atmosphere is inhaled by the workers, leading to discomfort and nausea.

Since the medicinal materials are of various colors, the dusty room is most unpleasant both in appearance and as a place in which to work. The filling room becomes particularly dirty looking and unpleasant where powdered carbon is the filling material or part of it. And the capsules themselves, when covered with the black carbon powder, are unprepossessing and even more difficult to clean because of the lubricating quality of the carbon.

An object of my invention is to modify the operation of such a machine as is shown in the patent referred to, so that leakage of the powdery material dust into the atmosphere is substantially limited, and, more particularly, so the capsules are dusted automatically when they are removed from the disk plates after the filling operation, thereby obviating any need for manual handling to clean the capsules.

The important feature of my invention is the arrangement for automatically cleaning the filled capsules so they need not be manually handled for that purpose.

In cleaning the filled capsules, I utilize their relative mass and the kinetic energy which they acquire in their fall when ejected from the disk plates, plus additional kinetic energy which is imparted to them by a moving air stream which accelerates them in their path of fall into the collecting box.

When the filled capsules are ejected from the disk plates, they are permitted to fall in a straight downward path through a wide conduit. The conduit is open at the top, but is closed at the bottom by a hinged door disposed directly above a collecting box. An air-exhaust system is connected to the conduit adjacent its lower end through an opening in the side of the conduit wall and pulls an air stream downward through the top opening where the filled capsules drop into the conduit. That air-stream further accelerates the capsules and adds to their kinetic energy.

Inside the conduit, just above the exhaust opening, a wire mesh screen is slopingly disposed to close off about 70 to 80% of the sectional area of the conduit so the dropping capsules will strike that screen and momentarily stop or bounce back off the screen, before resuming their downward movement through the narrow opening at the edge of the screen. That sudden stop or bounce of the capsules tends to flick off any powder dust on the surface of the capsules. The moving air stream immediately catches those freed dust particles and removes them, leaving the capsules clean as they proceed on their downward path to the collection box.

The arrangement of the machine parts and the manner of operation of the invention are shown in the accompanying drawing in which Figure 1 is a schematic front elevational view, with parts broken away, of a filling machine, of the type shown in the patent referred to above, but as modified to embody and operate in accordance with my invention; and Figure 2 is a sectional view of a portion of the disk plates for a capsule.

As shown in Fig. 1, a capsule filling machine 10 comprises generally a platform or table 11 above which are supported a hopper 12 for capsules and a hopper 13 for powdered medicinal material that is to be fed into the capsules. Both hoppers are supported on suitable standards that are not shown since they are not needed to illustrate the invention, and are shown in detail in the patent referred to.

Under the capsule hopper 12, the table 11 is arranged to support two annular disk plates 14 and 15 for periodically controlled progressive rotary motion, so the annular plates will be progressively angularly advanced and stopped to receive capsules from the hopper 12. By suitable means shown in the patent referred to, but which need not be illustrated for the purpose of this invention, the capsules are all fed in the same manner from the hopper 12 to the plates 14 and 15 through a hopper guide tube 12-a.

A medicinal capsule 16, as is well known, and as is illustrated in Fig. 2 of the drawings, consists of an inner or body portion 16-a, for receiving a charge of medicinal material, and a closing or cap portion 16-b for frictionally fitting over the body portion and closing it to hold the material charge inside.

Such capsules, when originally made, are fitted together and closed, and are thus supplied in closed form to pharmaceutical manufacturers who fill the capsules with various medicinal materials.

The capsules are opened in the filling machine just prior to the filling operation. That opening operation is effected in the two disk plates 14 and 15. The two annular disk plates 14 and 15 are provided with registering co-axial holes 18 and 19, parallel to the common disk axis, to accommodate about a hundred capsules.

The holes 18 and 19 in the two plates 14 and 15, as shown in Fig. 2, are respectively of such size as to receive the body portion 16-b in hole 19 in lower disk plate 15, and the cap portion 16-a in hole 18 in upper plate 14. The diameter of the hole 19 is large enough to accommodate the body 16-b but too small for the cap 16-a to enter. Each lower hole 19 has a small connecting passage 19-a at the bottom which communicates with a recessed chamber (not shown) in the table of the machine, in which the plate 15 is seated while receiving the empty capsules. A vacuum pressure is established in that chamber under plate 15 when all the holes in the plate are filled with capsules. The consequent lowered pressure in the lower hole 19 permits the greater normal pressure within each capsule to force the capsule body 16-b downward, to open the capsule and thereby separate the body 16-b from the cap 16-a. The capsules are then ready for the filling operation.

Since the capsules are now open, the plates may be separated. The top plate 14, when raised, will carry the cap portions 16-a, and is set aside for the moment until the filling operation is completed.

The lower plate 15 with the body portions 16-b is removed from under the capsule hopper 12 and is placed on a rotatable circular drive plate (not shown) on the table 11 under the material hopper 13. The hopper 13 is permitted a slight swinging movement out of the way to permit the capsule-carrying plate 15 to be placed on that rotatable drive plate. Restoration of the hopper 13 brings the mouth of the hopper in direct contact with the top surface of the capsule disk plate 15. That plate 15 is then rotated through one rotation while an impeller screw (not shown) in the hopper 13 forces the powdery material through the mouth of the hopper into the open capsule bodies 16-b. The filling operation is completed and the capsules may now be reclosed.

During the filling operation just completed, not withstanding the close fit between the top surface of plate 15 and the mouth of the material hopper 13, considerable powder dust leaks out to cover the top of the plate 15 and the table 11 around the plate 15 and its driving connection.

Because of the fact that the capsules and their contents are for human consumption, no brushing or other similar action may be performed to move any of the leakage dust until the plate with the filled capsules is removed, lest those filled capsules be contaminated by any moving material from the machine surfaces.

Therefore, as soon as the capsule bodies are filled, the upper plate 14 with the capsule caps, which was momentarily set aside, is replaced in proper superposed fitting position on the plate 15 with the filled capsule bodies.

The capsules 16 are then closed by holding the two plates 14 and 15 together in place adjacent pusher pins (not shown) above a receiving chute 22 at the middle of the machine above the table 11, and between the two hoppers 12 and 13. While the plates 14 and 15 are thus held in place, the pins are moved forward to push the capsule bodies forward and into the caps to close the capsules. The pusher pins are of suitable thickness to be able to enter the small openings 19-a. The pusher pins are equal in number to the capsules and capsule holes 19 and of course are properly positioned to be in axial alignment with those holes for easy and ready entrance. While the pusher pins push the filled capsule bodies 16-b forward into the capsule caps 16-a, the caps are held from being pushed forward and out of the plate 14 by the frictional forces and movement of the capsule bodies, by a restraining front plate 23 pivoted to downward position in front of the plate 14. After the capsules are closed by the pusher pins forcing the capsule bodies into their caps, the restraining front plate 23 is swung out of the way and the plates moved further onto the pusher pins to force the closed capsules out of the plates 14 and 15. The capsules thus ejected fall into the receiving chute 22.

When the two plates 14 and 15 were superposed after the capsule bodies were filled, some loose powdery dust of the material was present on the top surface of the lower plate 15. That loose powder does not enter the filled capsules due to the superposition of the capsule caps over the capsule bodies, and subsequent reclosure of the capsules by the pusher pins when the two re-engaged superposed plates are pushed against and over the pins. That loose powder is released, however, to fall onto the outside surfaces of the capsule bodies, to which the powder adheres as the capsules are thrust out of the plates and are permitted to fall into the receiving chute 22, and then into a suitable container as will be described presently.

Prior to my invention, the filled capsules were collected in a box or drawer on the under side of table 11, and they were covered with that adhering powdery dust and had to be manually scrubbed and polished to remove those adhering dust particles.

By means of my invention, however, the dust particles that adhere to the capsules during the filling operation are separated and removed from the capsules before they are collected in the box into which they are directed.

As shown in Fig. 1, the chute 22, into which the ejected capsules fall, communicates with a wide elongated conduit 25 that extends straight downward to above a receiving or collecting box 26 on the floor. Near the lower end of the conduit 25 an exhaust system 27 is connected from an exhaust fan 28 through a pipe 29 to communicate with the inside of the conduit through an opening 31 in the side wall 32 of the conduit 25. The lower end of the conduit 25 is closed by a door 35, pivotally mounted on a pivot pin 36, and provided with an adjustable balance weight, shown as consisting of a threaded rod 38 and a movable threaded nut 39 for adjusting the closing or restoring pressure on the door to tend to normally just hold the door closed.

When the exhaust system is operating the bottom door is additionally held closed and a stream of air is sucked into and through the conduit 25 through the opening at the chute 22.

When the filled capsules are ejected from their plates 14 and 15 and drop into the chute 22, they are accelerated in their dropping movement by the downwardly moving air stream caused by the exhaust. The capsules thus have both their own kinetic energy, due to their high initial position, and the kinetic energy imparted to them by the moving air stream. That kinetic energy is utilized to separate the surface dust particles from the capsules so the dust may then be immediately carried off by the exhaust air stream.

The dropping capsules, impelled by gravity and by the exhaust air stream, drop rapidly in the conduit 25 and strike a sloping wire-mesh screen 40 supported within the conduit 25 from the left-hand side wall 41 to almost the inner surface of the right-hand wall 42. The screen fills the space between the front and the rear walls, so only a narrow space 43 is left between the lower edge of the screen 40 and the side wall 42, to permit the decelerated capsules to roll through from off the screen 40. The exhaust outlet 31 is covered by a screen 45 to prevent any capsules from being drawn along by the air stream to the exhaust system. The main screen 40 is preferably placed so the lower edge will be above the screen 45 covering the exhaust opening 31, thus permitting the dropping capsules to experience a second bump at a region near the exhaust port where the air stream velocity is at its maximum while still effective to work on the capsules.

The conduit 25 is elongated, and is unobstructed from the mouth, or opening, where the capsules are inserted, down to the first screen 40, as a result of which the capsules have a free and unimpeded drop or fall through a substantial length of path, during which fall they are accelerated by the air stream and caused to acquire extra kinetic energy, to make the sudden stopping more effective to separate the dust particles from the capsule surfaces.

Both screens 40 and 45 are relatively taut so they will present a resilient surface to the dropping capsules. The two screens are also set at sufficient slope to assure that the capsules will slide or roll off. When a batch of capsules accumulates on the bottom door 35, the door opens to release the capsules to the collecting box 26. If so desired, of course, the door could be left closed until manually opened.

By the sudden arresting of the downward movement of the capsules in the path of an exhaust air stream, the dust is flicked off and carried away by the exhaust air stream, as shown by the dust particles 47 and the arrows 48, and the capsules are collected in box 26, ready for packaging, without any need for further cleaning or dusting.

My invention is not limited to use on and with the filling machine itself, since the dusting conduit could be set up as a separate element with its exhaust air stream and a batch of filled capsules as still covered with the dust of the filling material dropped into the conduit at the top, and the air stream would carry off the dust that would separate from the capsules when they bump into the screens.

I claim:

A capsule dusting and cleaning device comprising an elongated vertical conduit having an opening at the top to receive capsules to be cleaned and an opening at its lower end for removal of such capsules, the conduit being unobstructed throughout the major portion of its length beneath said top opening, a door supported to close the lower opening of said conduit, an exhaust fan outside of the conduit and connected to an exhaust port in the conduit wall to communicate with said vertical passage near the bottom of said passage, and operative to draw a stream of air downward from the top opening through the length of the passage down to and out of the exhaust port, whereby said air stream is caused to accelerate the downward movement of any capsules introduced into said top opening of said vertical conduit, a main screen supported at an incline in the conduit passage and extending downwardly from a first wall opposite the exhaust port to a short distance above the exhaust port and with the lower edge of the screen spaced a short distance from a second wall which is opposite the said first wall of the conduit, the screen being at a substantial distance below the top opening of said passage where the capsules are introduced, and the screen serving to momentarily stop and jar the dropping capsules in their downward movement, and the space from the lower edge of the screen to the second wall of the conduit being sufficient to provide a free drop-through space for any capsules to roll off the main screen after having been momentarily stopped by said main screen in their falling movement through the conduit passage, and a secondary screen covering the port and also embodying an inclined portion situated directly beneath said drop-through space to momentarily stop the capsules a second time, and to prevent them from entering the exhaust port and to permit them to continue on their downward movement to the said closure door, to be there collected until removed.

ALEXANDER BODNAR.

REFERENCES CITED

The following references are of record in the file of this patent:

UNITED STATES PATENTS

| Number | Name | Date |
|---|---|---|
| 21,662 | Fisher | Oct. 5, 1858 |
| 693,455 | Stanley | Feb. 18, 1902 |
| 1,576,093 | Cooke | Mar. 9, 1926 |
| 1,819,936 | Wilkie et al. | Aug. 18, 1931 |
| 2,425,984 | Blackman | Aug. 19, 1947 |

FOREIGN PATENTS

| Number | Country | Date |
|---|---|---|
| 238,749 | Great Britain | Aug. 27, 1925 |